United States Patent [19]

Chou et al.

[11] Patent Number: 5,222,215
[45] Date of Patent: Jun. 22, 1993

[54] CPU EXPANSIVE GRADATION OF I/O INTERRUPTION SUBCLASS RECOGNITION

[75] Inventors: Norman C. Chou; Peter H. Gum, both of Poughkeepsie; Roger E. Hough, Highland; Moon J. Kim, Fishkill; James C. Mazurowski, Poughkeepsie; Donald W. McCauley, Pleasant Valley; Casper A. Scalzi, Poughkeepsie; John F. Scanlon, Hyde Park; Leslie W. Wyman, Poughkeepsie, all of N.Y.

[73] Assignee: International Business Machines Corporation, Armonk, N.Y.

[21] Appl. No.: 752,149

[22] Filed: Aug. 29, 1991

[51] Int. Cl.$^5$ .............................................. G06F 13/00
[52] U.S. Cl. ................................................... 395/275
[58] Field of Search ................... 364/DIG. 1, DIG. 2; 395/275, 800, 425

[56] References Cited

U.S. PATENT DOCUMENTS

4,564,903  1/1986  Guyette et al. .................. 395/275 X

Primary Examiner—Robert L. Richardson
Attorney, Agent, or Firm—Bernard M. Goldman

[57] ABSTRACT

A CPU interface recognizing a large very number of I/O interruption queues in a logically partitioned data processing system. Different partitions may contain different guest operating systems. The CPU interface controls how plural CPUs respond to I/O interruptions put on numerous hardware-controlled queues. A host hypervisor program dispatches the guest operating systems. The guests use the I/O interruptions in controlling the dispatching of their programs on the CPUs in a system. The invention allows the number of guest partitions in the system to exceed the number of I/O interruption subclasses (ISCs) architected in the system, and enables the dispatching controls of each guest operating system to be sensitive to different priorities for plural programs operating under a respective guest. The invention provides CPU controls that support alerting the host to enabled I/O interruptions, and provides CPU controlled pass-through for enabling direct guest handling of the guests I/O interruptions.

45 Claims, 7 Drawing Sheets

CPU EXPANSIVE GRADATION OF I/O INTERRUPTION SUBCLASS RECOGNITION

INTRODUCTION

This invention relates to a CPU interface for a large number of I/O interruption queues in a logically partitioned data processing system containing plural guest operating systems. The CPU interface controls how a CPU responds to the I/O interruptions for controlling how a host hypervisor program dispatches its guest operating systems and how the guests dispatch their programs on one or more CPUs in a system. The invention allows the number of guest partitions in the system to exceed the number of I/O interruption subclasses (ISCs) architected in the system, and enables the dispatching controls of each guest operating system to be sensitive to different priorities for plural programs operating under a respective guest. The invention enables the CPU dispatching controls to support all I/O interruption queues available to the guests in the system.

BACKGROUND

A prior partitioned system is disclosed in U.S. Pat. No. 4,843,541 to Bean et al, which is assigned to the same assignee as the subject invention. In that patent, each partition (called a "zone") in the system supports a respective guest operating system (called a "guest"), which may be a copy of the IBM MVS or VM operating system. A hypervisor program (called the "host") supervises all guest operating systems in the different partitions of the system.

The description in U.S. Pat. No. 4,843,541 limits the maximum number of partitions in the system to the maximum number of I/O interruption subclasses (ISCs) available in the pending register in each CPU in the system, which enabled a total of eight I/O interruption subclasses (ISCs) to be used. Each ISC corresponds to an I/O interruption queue which receives a subset of I/O interruptions from a designated subset of I/O devices. A pending register in each CPU having a maximum of eight ISC positions was the physical interface of the CPU to the I/O interruptions pending in the system. The drawings and specification of U.S. Pat. No. 4,843,541 are incorporated herein by reference.

U.S. Pat. No. 4,271,468 to N.T. Christensen et al discloses and claims the use of a pending register in each CPU for indicating to the CPU whether any I/O interruption exists in corresponding I/O interruption queue subclasses. The pending register enables a CPU to know of the existence of pending I/O interruptions in respective ISC queues and allows the CPU to prioritize the pending interruptions for controlling the dispatching of programs on the CPU. The drawings and specification of U.S. Pat. No. 4,271,468 are incorporated herein by reference.

However, the U.S. Pat. No. 4,843,541 disclosure has the limitation of one host controlled ISC per partition for handling all guest I/O interruptions in the partition. This limitation occurs via a mechanism called an EIEM (effective I/O enablement mask). This limitation resulted in: 1. the system having a maximum of eight zones. (corresponding to the eight ISC positions in each CPU pending register, and 2. each guest losing some ISC priority granularity among its guest I/O interruptions.

The use of one host ISC per guest operating system forces all of the I/O interruptions of each guest to funnel through one assigned host ISC (regardless of which of up to eight different guest I/O queues may have received an I/O interruption). Only the host ISC was available to control the dispatching of each guest's program on the CPUs in the system. Thus, the eight ISC positions in the EIEM (corresponding to the eight ISC positions in the CPU's pending register) caused the limitation of the eight partition (zone) maximum in the system, and further limited each guest to only one effective ISC.

A hypervisor software program, called the host, provides overall control of the system, and the host communicates with the guests by guest operations providing special exception signals in the system.

Zones include areas in system main storage respectively assigned to the logical partitions configured from all of the resources of a Central Electronics Complex (CEC). The CPU resources in the CEC are not usually dedicated to any single partition. And, the CPUs are usually temporarily assigned to all partitions by dispatching a CPU for a partition that has a program ready to execute with the resources available in that partition. Each partition uses a software system—usually an operating system—that controls the operation of all programs in a partition; and it is the guest in the partition. Thus, each partition is defined as a subset of the CEC's resources assigned to it. Guests may be dispatched on any CPU in the system by the CPU executing the IBM ESA/390 start interpretive execution (SIE) instruction. Guest execution on a CPU ends each time the SIE state of the guest is ended (SIE is intercepted).

Each guest operating system in turn can dispatch virtual processors (and virtual multi-processors, MPs) in its partition using the SIE instruction in the ESA/390 architecture. And the dispatched virtual processors can then execute application programs on the real CPUs on which the guests are dispatched. An application program is accessed in system memory through the guest PSW. The guest's PSW is initialized from the guest's SD (state description). The SD is the operand of the SIE instruction which the host uses to dispatch a guest.

A pageable-storage mode is used for V=V guests, in which the guest's absolute storage is mapped contiguously onto the virtual storage of the host. The host DAT (dynamic address translation) facility handles the V=V guest absolute storage as a host virtual space. A preferred guest (V=F guest) is mapped directly onto the host's absolute storage, using an offset and limit absolute address for each guest to locate the guest zones in system memory. A V=R guest is a special case of a V=F guest in which the offset is zero.

SUMMARY OF THE INVENTION

The invention enables an "explosion" in the number of I/O interruption subclasses (ISCs) which can be recognized by each CPU in a logically partitioned system. The number of I/O interruption subclasses recognizable by a CPU is increased by more than an order of magnitude.

The invention uniquely allows a great increase in the number partitions supportable in a logically partitioned system, and at the same time allows a significant increase in the number of I/O interruption subclasses (ISCs) operable in each partition. The invention accomplishes this "explosion" by making the number of partitions in the system independent of the number of I/O interruption subclasses available in the system architecture. In a system using the ESA/390 architecture, this invention breaks the prior barrier of limiting the maximum number of partitions in a system to the number of I/O interruption subclasses (ISCs) supported by the system architecture which previously limited each system to a maximum of eight partitions.

The zones in the system are respective parts of the system main storage (memory) allocated to different logical partitions, among the system resources assigned to the partitions. Each partition runs a different copy of a software operating system, such as VM or MVS, which are the "guests" in the system. A software hypervisor is the "host" which monitors all of the guests. Each guest is assigned a zone number (AZN), which is used by the system to relocate the real addresses of CPU-executing programs running under a guest in a given partition. Also the zone numbers have been used by guest I/O programs (I/O channel programs) to relocate the I/O programs into an assigned zone, and to assign that zone to receive the I/O interruptions of its assigned I/O programs.

CPU-program processing of I/O interruptions from I/O programs started by guests is most efficiently handled by the issuing guest. But prior partitioned systems have had significant constraints in allowing guests to process their I/O interruptions, requiring the host to process them. The expansion in the number of ISCs allowed to each guest by this invention greatly reduces the circumstances under which the host must process I/O interruptions of the guests.

This invention separates the I/O interruption zone from the relocation zone which contains the I/O program. The "relocation zone" is the zone in which an executing program (not written for a zoned memory system) automatically has its program-provided real addresses relocated into the zone of an assigned guest (which is done by adding the assigned zone's offset to the real addresses provided by the program). This separation allows host execution of I/O programs in guest storage without pass-through, wherein the interruption is directed to the host's zone, while the I/O program remains in the guest's zone. This avoids the address translation of channel programs for non-pass-through guests, particularly for such guests who share I/O devices.

The invention enables the architected maximum number of I/O Interruption subclasses (ISCs) to be provided for each zone, rather than for all zones (the latter being the previous limitation)—so that the eight ISCs in the IBM ESA/390 system can now be provided for each of N number of zones. That is, N is no longer limited to eight zones for the system. Thus, N may now be any number without theoretical limitation, and there will be N*8 number of zones in the system, instead of merely eight zones in the system.

Thus, this invention provides independence between guest partitions (zones) while allowing each guest to use all of the CPU's I/O interruption subclasses (ISCs) to assign priorities among the guest's I/O operations.

Accordingly, the invention eliminates the prior dependence on the maximum number of guests not exceeding the number of host ISCs. This eliminates both the prior limitation on the maximum number of zones available in a partitioned system, and the prior limitation of only one host ISC being available per guest. This previous one-to-one dependent relationship between number of zones and number of ISCs is eliminated. This new-found independence allows any number of partitions to be provided in a partitioned system, as long as sufficient resources exist to support all partitions. Now, the number of partitions can far exceed the maximum number of ISCs available to the host. The invention does not provide any theoretical limit on the maximum number of partitions in a system. Hence, the invention allows each partition to use plural ISCs, up to the maximum number of ISCs provided by the system architecture. The IBM ESA/390 architecture provides eight I/O ISCs.

The ISCs associated with each zone described herein have the properties defined for ISCs in the ESA/390 architecture, in which an ISC represents a hardware I/O interruption queue, and the setting on of an ISC bit in an IPR (I/O interruption pending register) indicates whether there are elements in the respective queue representing pending I/O interruptions. An off setting of an ISC bit in an IPR indicates the associated queue has no pending I/O interruption.

A queue is called a hardware queue when it is only visible to the hardware and microcode in the system, and is not directly visible to the system software. The host may generate software queues that replicate the hardware queues, and the software queues are used as backup and to preform special queuing functions by the host for the guests, such as allowing the host to take an I/O interruption for any guest. Although the hardware queues are not visible to the software, the resulting program interruption itself is visible to the software which receives enough information to enable it to track its software queues with the hardware queues.

The host takes an I/O interruption by swapping the host's I/O PSWs (program status words) to access the host's interruption handler program. The guest takes an I/O interruption by swapping the guests I/O PSWs in the guest's SD (state description) control block in main storage to access the guest's interruption handler program. Thus, the guest and host have separate sets of PSWs, and they have separate interruption handler programs. When an I/O interruption is taken, its queue element is removed from its associated hardware queue, and the associated ISC bit in the IPR is set off if no other pending I/O interruption is represented in the associated queue. The ISC bit in the IPR is set on again if any pending I/O interruption remains on that queue.

The invention provides in each CPU an I/O interruption recognition means which includes a unique guest pass-through facility and a unique host alerting facility. All host I/O interruptions are passed directly to the host.

The guest pass-through facility has the unique characteristic of enabling a guest currently dispatched on a CPU to directly handle I/O interruptions for that guest without ending the guest's dispatch. (Prior systems ended the SIE dispatch of a guest, called SIE interception, to allow the host to take the interruption for the guest.)

The alerting facility alerts the host to the existence of an I/O interruption for any guest when the guest is not operating on the CPU, such as when the guest is in a wait state or is merely not currently dispatched. Previous systems could not alert for a guest I/O interruption when the guest was in wait state or was not dispatched on any CPU. The alerting facility is usable while its CPU is operating in either native mode (host mode) or emulation mode (guest mode).

The alerting facility includes an I/O interruption recognition means in each CPU. The I/O interruption recognition means comprises a storage array (or preferably a table of register pairs) for the respective zones supported by the system. For each zone, its register pair includes an IPR and an associated masking register having a masking position for each ISC position in the associated IPR. The register pairs are prioritized according to priorities assigned to the different zones. Any mask position in the mask register may be mask-on or mask-off independently of any other position. A mask-on position enables its corresponding ISC position to be used in a process that selects the enabled ISC having the highest-priority in the zone having the highest-priority, which excludes zones of still higher priority having no enabled ISC. The priority-selected ISC is identified by its zone value and its ISC value, which is herein referenced by the notation "zone.ISC" which indicates the two dimensions for the location of the ISC within a conceptual "zone masking table (ZMT)" in the I/O interruption recognition means.

This invention supports I/O interruption enablement specifications by providing means for loading and storing separate zone masks for the different I/O interruption recognition means in the respective CPUs in a system. A mask may be loaded at any time that the recognition means is not being accessed for a different purpose. This frees the computer hardware from having to establish effective enablement masks at Start Interpretation Execution (SIE) entry and avoids having to use the guest Load Control (LCTL) instruction for mask loading.

The invention also provides computer hardware for determining which action: host interruption, alert interruption, or guest pass-through interruption should be taken for a pending I/O interruption that was enabled by an effective enablement mask.

This invention provides several new instructions: Set Zone Mask (SZM) and Store Zone Mask Table (STZMT) to control alerting enablement, and a SIGP Set Zone Mask Table facility that enables one CPU to set the zone mask table (ZMT) of another CPU.

A unique characteristic in the I/O interruption recognition means is the provision of a clear position with each zone mask in the ZMT. The clear position controls whether an I/O interruption selected from the respective zone is to be taken by the host or left pending after alerting the host for the associated guest to take the interruption.

This invention enables a CPU (rather than the host, while the guest is dispatched on the CPU) to directly pass-through the guest's I/O interruptions for some types of guests (e.g. V=R and V=F type guests), which allows these guests to handle the interruption without host intervention. The result is to increase CPU performance in its handling of I/O interruptions by eliminating additional testing and control operations previously required of the system host hypervisor to perform the pass-through function to a guest.

The masking hardware provided by this invention in each CPU enables the CPU to inform the system host of the existence of any I/O interruption for any guest even when the guest is not dispatched on this or any other CPU, and while the guest is in wait state. This alert signalling provides the host with the choices: 1. To dispatch the guest on any CPU which accepts the I/O interruption for handling, or 2. To leave the interruption pending on its queue to be taken by the guest during its next normal dispatch (time slice), or 3. For the host to handle the I/O interruption for the guest (such as for a V=V type guest).

A predetermined setting of the mask for controlling guest pass-through and alerting is done on a per CPU basis. That is, a CPU can be selective and indicate it wants to be alerted for some interruptions, and not be alerted for other interruptions.

This manner of handling can avoid the overhead of the host receiving all I/O interruptions and being required to simulate all interruptions for its guests, which is particularly useful with preferred guests using direct I/O interruption pass-through from a CPU.

Therefore, this invention provides a CPU interface to all I/O interruptions in the system, by which both the pending and priority enablement state of all potential I/O interruptions in the system is maintained by each CPU, where it can be communicated by the CPU to software making dispatching decisions for the guests while executing on the CPU.

This enables more efficient CPU dispatching operations than were previously obtainable with a single ISC handling all I/O interruptions for each guest.

Associated I/O interruption CPU selection hardware (connected among the CPUs in the system) allows any CPU to handle any pending I/O interruption. This is done by the I/O subsystem broadcasting each I/O interruption signal to all CPUs in the computer system, indicating the zone.ISC of the interruption (obtained from a control block in the subchannel). Each CPU receives the signal and accesses the signalled zone.ISC location in its I/O interruption recognition means, and sets on that ISC position to indicate an I/O interruption exists in the associated subchannel I/O interruption queue.

When any CPU reaches an interruption point in its instruction processing, the CPU sends its current highest-priority enabled zone.ISC with its CPU identifier (CPUID) to an I/O interruption coordination means in the system (such as in a system storage controller connected to all CPU recognition means in the system). The coordination means breaks any tie if more than one CPU wants to handle the same zone.ISC by responding to select only one CPU to handle that zone.ISC. It responds by broadcasting to all CPUs the CPUID of its selected CPU and the zone.ISC. Each CPU receives the broadcast and compares it to its CPUID. If they compare-equal, the CPU knows it has been selected, and that CPU proceeds to handle that interruption. If they compare-unequal, the CPU knows it has not been selected, and that CPU proceeds to delete that interruption from its recognition means. The recognition means in all CPUs reset that zone.ISC in each CPU. Only the first CPU that responds to the interruption signal is ormally selected to handle the I/O interruption. Any CPU in the system may be selected to handle any I/O interruption for which it is enabled. After processing the I/O interruption request, microcode in the selected CPU checks the associated hardware queue header to see if any other pending I/O interruption request exists in that zone.ISC queue. If any is found, that CPU broadcasts a request to all CPUs to again set on the bit in the IPR corresponding to that zone.ISC queue.

This invention also allows the CPU detection of the existence of an I/O interruption for a guest which uses selective ISC enablement independent of the guest's dispatched status.

The I/O interruption means in each CPU continuously operates to determine its highest-priority enabled zone.ISC on each CPU cycle, in parallel with the normal activities of its CPU. Each determination is registered in an I/O code register. Each accepted zone.ISC is removed at the end of each cycle from all CPUs and is set again into all CPU recognition means only if another I/O interruption exists for the same zone.ISC, so that any accepted I/O interruption will not be available to any CPU on another cycle.

The invention also enables a different zone in the system memory to receive the I/O interruptions from a subchannel other than the zone containing the I/O program. An advantage of using these different zones is to allow a host to use an I/O program in a guest zone while maintaining isolation between the zones. This is done by providing two different zone identifiers in a subchannel control block, i.e. both an interruption zone number (IZN) and a relocation zone number (RZN), for example in the PMCW part of the SCHIB subchannel control block in the ESA/390 architecture.

This multi-zone feature also allows the guest receiving the I/O interruptions to be switched from one guest to another guest by the host changing the IZN value in the PMCW.

The SIE architecture allows a first level guest (i.e. a guest that was dispatched by the host) to act as a host and to dispatch a guest (called a second level guest). With this invention, the second level guest can be dispatched as a passthru guest. The introduction of the IZN, in addition to the RZN and the ISC fields in the subchannel control block, allows this function by permitting a 1st level host to use the ISC field in the subchannel to queue, direct and enable I/O interruptions for its second level guest w/o having to coordinate the use of the system's ISCs among other 1st level guests.

The new 1st level guest identifier (IZN) distinguishes I/O interruptions associated with 1st level guests, or their second level guests, from I/O interruptions associated with other 1st level guests or their second level guests. The IZN field also allows I/O interruptions associated with the 2nd level guest to be directed to the 1st level guest (not the host as would be the case with prior art) if required for error handling or simulation by the 1st level host. The host maintains full capability for receiving I/O interruptions associated with devices that are assigned to the host as well as I/O interruptions that have a host specified alerting specification.

The ISC field is used to distinguish one 2nd level guest's I/O interruptions from the I/O interruptions of another 2nd level guest who was dispatched in passthru mode by the same 1st level guest. This masking function is accomplished by generating an effective guest mask on the SIE dispatch of the second level guest that incorporates the mask specifications of the 1st level host and the second level guest, including any alerting specification made by the first level guest.

The RZN maintains its independence from the I/O interruption identifier as it did in the prior art. This permits the first level guest to have a different relocation specification (to include all of the 1st level host's storage as well as all of each of its second level guest's storage) from the relocation specification of each of its second level guests.

These and other novel features of the invention are defined in the attached claims.

DESCRIPTION OF THE DETAILED EMBODIMENT

Figure 1:
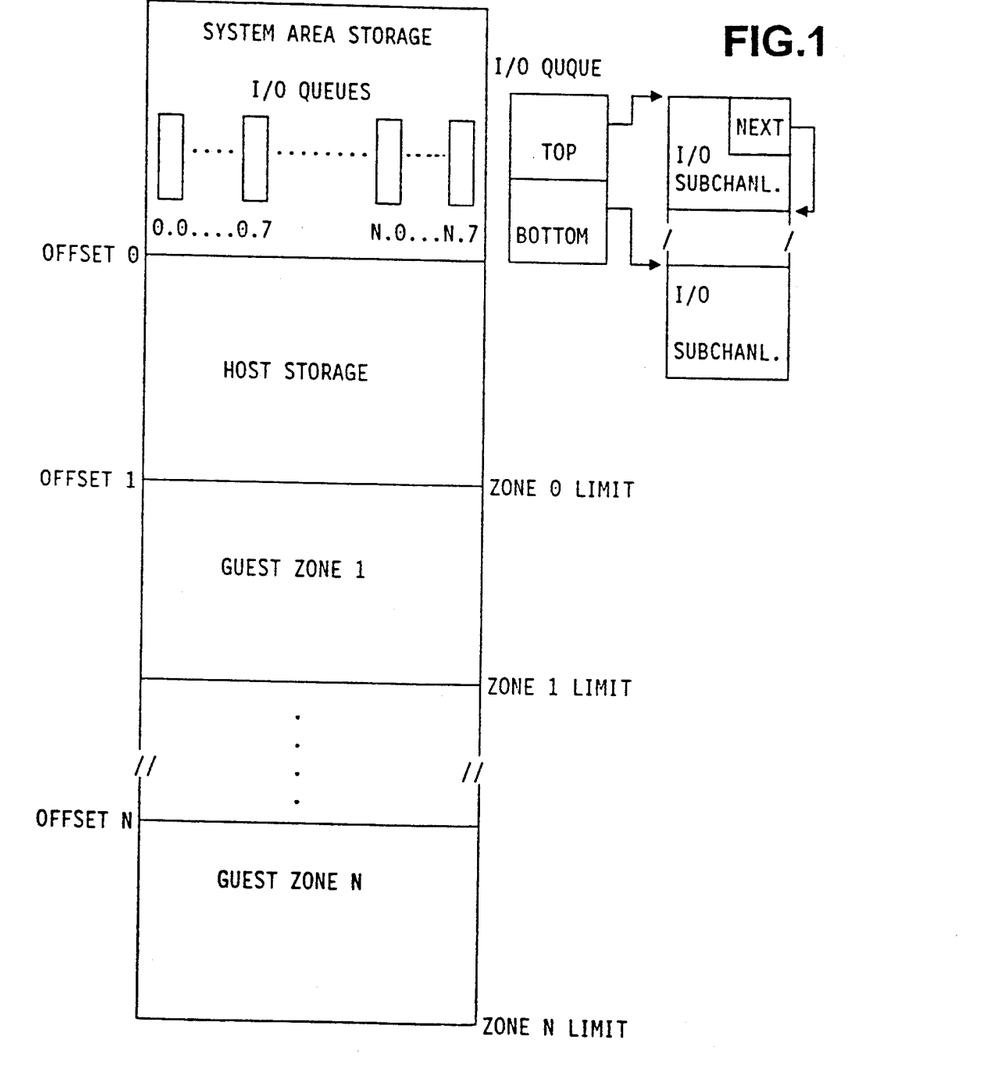
FIG. 1 shows a simplified map of a system memory having N number of guest zones in a computer system using the invention.

System Memory Map of Zones and System Area (FIG. 1)

FIG. 1 is a memory map of the system main memory, in which a system area is shown at the top of the memory map to represent an area that is available only to accessing by microcode and hardware, but cannot be accessed by software programs.

Within the system area are queues of elements representing I/O interruptions. These queues are called "hardware queues" because they are not supported or accessed by software, but by microcode which is considered a hardware entity.

There are eight I/O interruption queues provided for each zone of this embodiment. There is no theoretical limit to the number of zones provided by this invention, although there will be practical limits caused by the size of fields selected in any particular design of a system.

This invention allows an "explosion" in the number of I/O queues providable in the system area to a maximum of N*8, in which N is the number of zones provided in a system. Previously, a maximum of eight hardware queues were allowed in a system. Accordingly, an N times increase is provided by this invention in the maximum number of queues per system. For example, a system using this invention may have 24 zones with 192 hardware queues, instead of the prior maximum of 8 hardware queues.

Figures 7, 8:
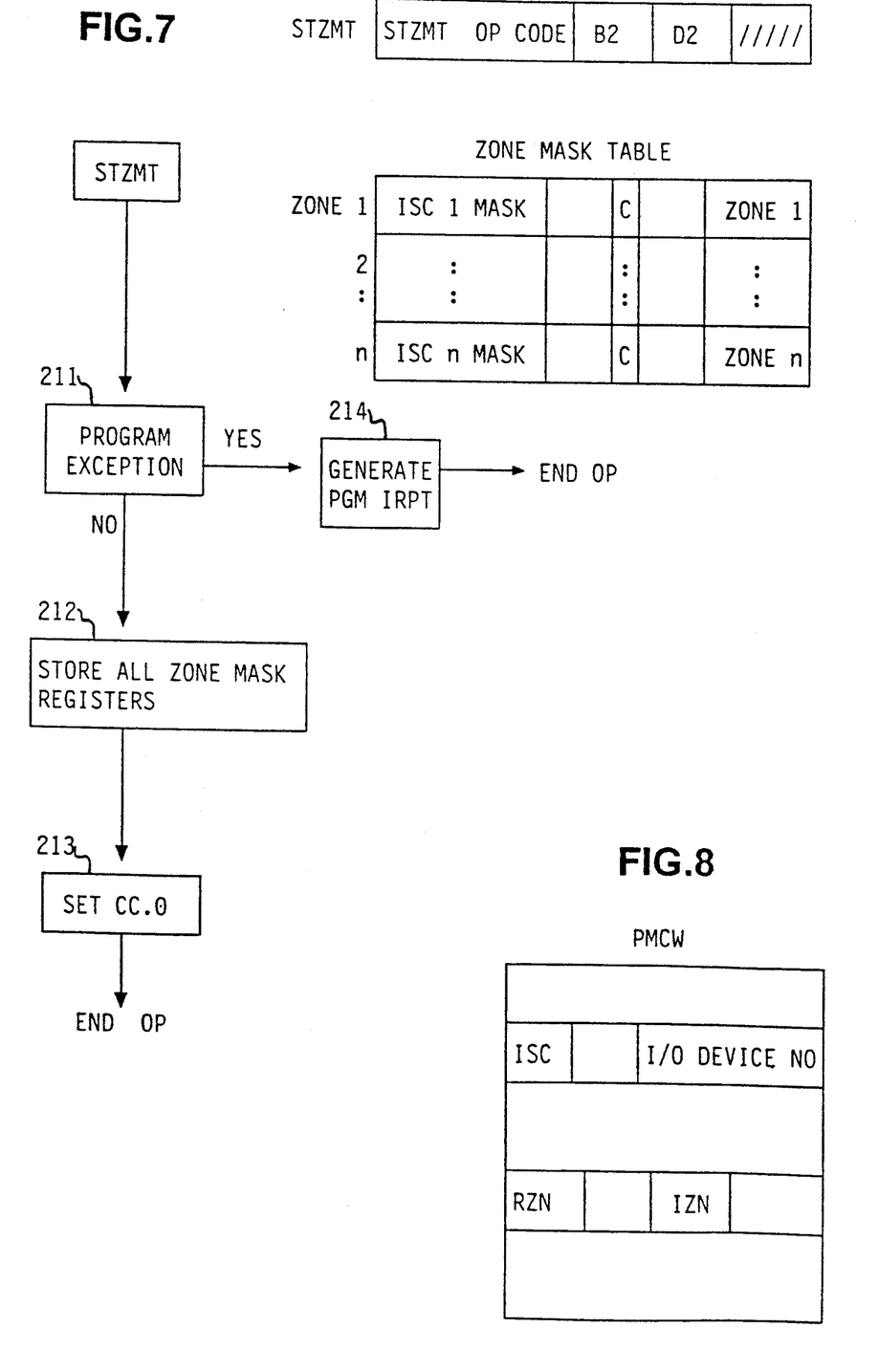
FIG. 7 represents a STZMT (store zone mask table) instruction, and its execution by the host to store the I/O interruption enablement masks in all CPUs into system memory at a predetermined memory location.
FIG. 8 represents an I/O subsystem control block, called the PMCW (path management control word) stored in system memory, which is used to control memory addressing for having the zone receiving I/O interruptions different from the zone containing the I/O program.

I/O Subsystem Communication to CPU Recognition Means (FIG. 8)

An I/O subsystem broadcasts information on each I/O interruption to all CPUs in the computer system which includes information in an I/O control block such as shown in FIG. 8 containing the assigned ISC, IZN, RZN and associated I/O device number. The most important for the purposes of this invention are the IZN (I/O interruption zone number) and the ISC (I/O interruption subclass code), which respectively are the zone.ISC sent to the CPUs for entry in their respective I/O interruption recognition means. The RZN (relocation zone number) is the zone containing the I/O program and its control information and may be a zone owned by the host and may not be accessible to any guest. Nevertheless, a guest may receive I/O interruptions from the subchannel by use of the IZN specifying the zone of the guest which is to receive the interruptions.

An command may be used to send subchannel information to a command register 4 (also shown in FIG. 3) for each CPU. The command is sent by a CPU broadcast bus which receives information from any CPU or any I/O subsystem using a command code and a zone-.ISC operand field, in order to cause the CPUs to locate and set a zone.ISC position in an IPR in its I/O interruption recognition means.

Each CPU then uses the command to address and set a zone.ISC position in its I/O interruption recognition means. This ISC position is an single ISC bit located in an IPR (I/O pending interruption register) for the respective zone. All registers 22 in every CPU receive the command simultaneously. When received, each CPU sets the corresponding IPR bit in its recognition means. But only one CPU will eventually handle each I/O interruption represented by an enabled zone.ISC setting in each CPU; all CPUs set a corresponding zone.ISC bit so that all CPUs are in a race condition to process the I/O interruptions on all zone.ISC queues, whereby any CPU may process any I/O interruption on any zone-.ISC queue.

A DEQ command with a zone.ISC operand is broadcast by a CPU each time any CPU requests to process an I/O interruption (by dequeuing it from the associated queue). Each DEQ command is likewise sent to each CPU's I/O interruption recognition means to reset its corresponding zone.ISC IPR position to an off state.

Figure 3:
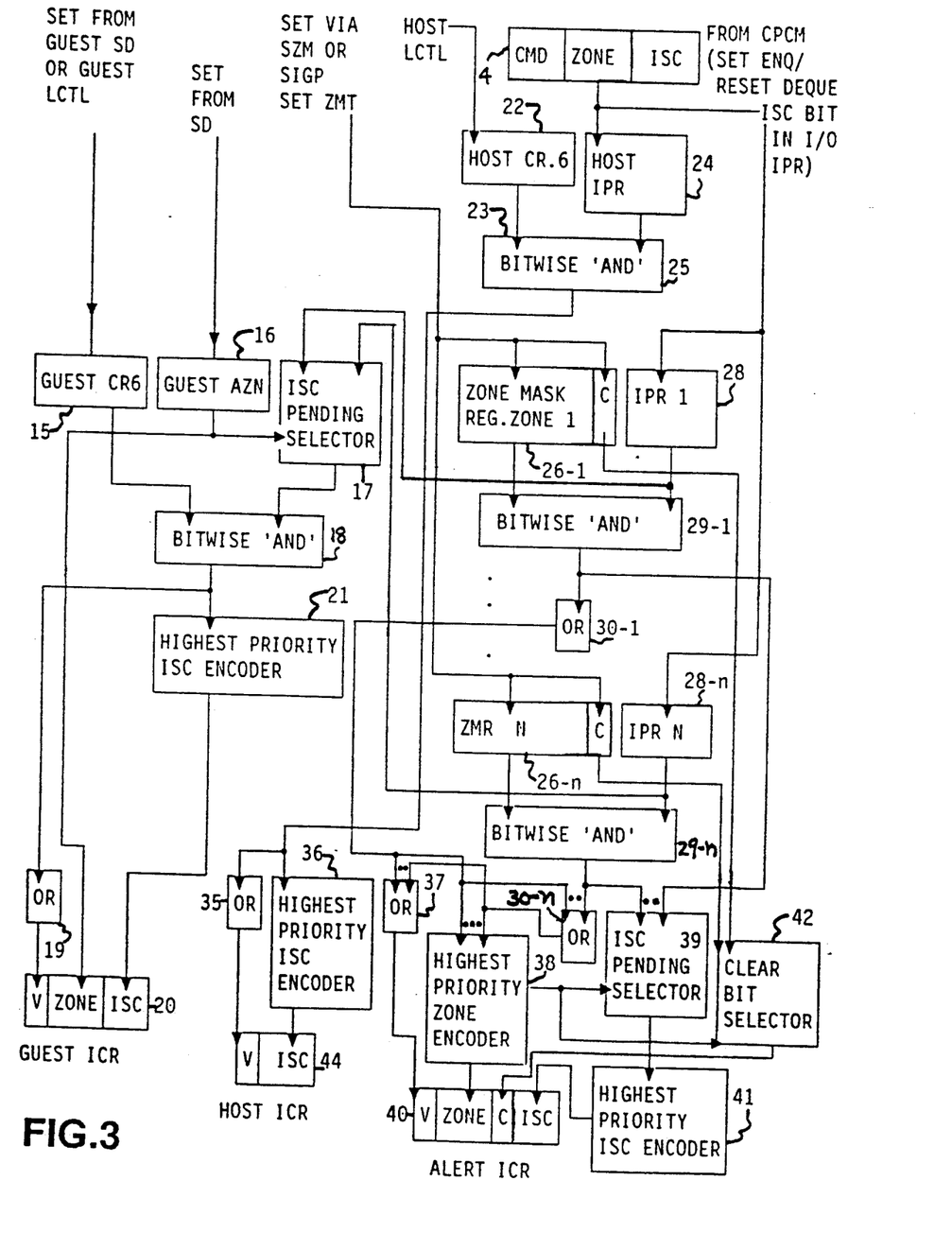
FIG. 3 represents I/O interruption recognition means found in each CPU of the computer system in a preferred embodiment.

CPU I/O Interruption Recognition Means (FIG. 3)

Host and Alerting Controls

The I/O interruption recognition means is shown in FIG. 3 as a set of register pairs 0-N; one register pair is provided for each partition (zone) available in the system. Each register pair comprises an I/O interruption pending register (IPR) 28, and a zone mask register (ZMR) 26. The bit positions 0-7 in each zone's IPR are set-on to indicate each interruption subclass (ISC) containing a pending I/O interruption. Each ZMR has eight mask bit positions 0-7 respectively corresponding to the ISC bit positions in the associated IPR of the register pair. A mask bit in zero state (disabled state) prevents the use of the corresponding ISC bit, and in a one state (enabled state) allows the use of the corresponding ISC bit.

Each guest ZMR 26 also has a clear bit C for controlling whether a pending I/O interruption represented in the associated IPR: 1. will be taken by the host, or 2. will not be taken by the host but will remain pending on its hardware I/O interruption queue after being examined by the host and will be cleared from the queue by the guest owning the interruption.

The ZMR 22 for the host zone (zone 0) is initialized by the host using the "load control" (LCTL) instruction. The host uses "set zone mask" (SZM) instructions to initialize the SMR 26 mask settings (including C bits) for zones 1 through N.

The register pair assigned to zone 0 is for handling host I/O interruptions. The other register pairs are assigned to zones 1-N are for alerting the host to guest I/O interruptions. Guest 1 is considered the highest-priority guest, and guest N is considered the lowest-priority guest in this embodiment. Thus the guest priorities are inversely related to the guest zone numbering.

All of the IPRs may be considered to comprise a pending register table (PRT) having a register for each respective zone available in the system. Likewise, all of the ZMRs may be considered to comprise a zone mask table (ZMT) having a register for each respective zone available in the system.

The ZMR 23 for the host zone 0 is a special case which uses the host control register 6 (CR.6) eight bit masking content.

The masking operation for each zone register pair uses an AND gate which ANDs the corresponding bit positions in the IPR and ZMR of the pair. Thus, IPR bit 0 is ANDed with ZMR bit 0, etc., through IPR bit 7 being ANDed with ZMR bit 7 to provide respective ANDed outputs 0-7; this type of AND circuit is herein called a "bitwise AND". Only the ISC bits set-on in an IPR and enabled in the ZMR can provide a signal on a respective output from the bitwise AND gate.

The outputs of the host bitwise AND gate 25 (for zone 0) are provided to a highest-priority ISC encoder 36 which indicates the highest-priority ISC number in the host's highest-priority zone 0, which is its highest-priority mask-on ISC set to a 1 state (the lowest-numbered enabled and set ISC) in IPR 24. This highest-priority ISC number is encoded as a three bit number in encoder 36, and stored into the ISC position of the host I/O code register 44. No zone need be stored in the host ICR (I/O code register) 44 because zone 0 is always implied for the host in this embodiment.

The valid bit V in ICR 44 is set by the output of an OR circuit 35, which receives all eight output lines from AND gate 25. An output from OR circuit 35 indicates the existence or non-existence of any pending interruption for the host. Thus, if any interruption for the host, a 1 output state is provided from the OR circuit into the valid field V in the host ICR 44 to indicate the valid state for its ISC content.

The eight outputs from each guest bitwise AND gate 29-1 through gate 29-N are provided to a respective OR circuit 30-1 through 30-N which provide respective outputs that indicate if any mask-on I/O interruption is indicated in the respective zone's IPR as needing to be serviced.

The outputs of the N number of OR circuits (for the guest zones 1 to N) are provided to a highest-priority zone encoder 38. It selects the lowest-numbered (leftmost) OR output signal as the highest-priority zone number having a enabled and set ISC for the alerting process. This zone number is provided to a zone field in the alerting ICR 40.

The outputs of all of the guest-zone AND gates 29-1 through 29-N are also provided to an alerting ISC pending selector 39 that selects the highest-priority enabled and set ISC position in the highest-priority zone having an enabled and set ISC. That is, the ISCs examined in the ISC pending selector 39 are only the ISCs in the currently selected highest priority zone. The selected ISC is provided to the ISC position in the alerting ICR 40.

The valid bit V in alert ICR 40 is set by the output of an OR circuit 37, which receives the outputs of OR circuits 30-1 through 30-N. An output from OR circuit 37 indicates the existence or non-existence of any pending interruption for any guest. Thus, if any interruption exists for any guest, a 1 output state is provided from the OR circuit 37 into the valid field V in the guest ICR 40 to indicate the valid state for its zone.ISC content.

Guest Pass-Through Controls (FIG. 3)

Each guest is defined by a state description (SD) located in a host exclusive part of main storage. The current guest is dispatched by the host executing the SIE (start interpretive execution) instruction of that guest, which has an operand which points to SD of the respective guest. Upon the SIE execution, the SD content for the guest's CR6 field and the guest's AZN (active zone number) field are copied into a GCR 6 register 15 and a guest AZN register 16 in the CPU doing the SIE dispatching.

An ISC pending selector circuit 17 receives the respective outputs of all of the IPRs, and selects only the IPR having a zone number equal to the guest AZN. Thus, selector circuit 17 outputs only that guest's set of enabled ISC values. A bitwise AND 18 receives all of the eight outputs from the selector 17 and ANDs them respectively with the eight bits in the guest CR6, which applies the mask in CR6 to the enabled and set ISC outputs from AND 18. This AND operation effectively applies a second mask to the ISC values in the guest's IPR, which are outputted to a highest-priority ISC encoder 21, which selects the lowest-numbered ISC that has a 1 state. The lowest-numbered 1 bit represents the current highest-priority ISC of the dispatched guest. The ISC output of encoder 21 is put into the ISC field in the guest pass-through ICR 20.

An OR circuit 19 sets a valid bit V in the guest ICR 20. OR circuit 19 receives all of the eight output lines from bitwise AND gate 18. The output of the OR circuit indicates if any enabled and set I/O interruption exists in the guest's zone. If no interruption exists for the guest, a 0 state is provided to the valid field (indicating invalidity) in the guest ICR 20. A 1 state indicates validity.

A new zone.ISC value may be provided to ICRs 44, 40 and 20 on each machine cycle, as long as each has I/O interruptions to be handled. Therefore on the next cycle, the same zone.ISC will be indicated if the ISC and mask states have not changed in the recognition means. They will change if addition or deletion of ISC settings changes the highest-priority pending I/O interruption to be handled by the ICRs in FIG. 2.

Alerting primarily finds its usefulness in being able to alert the host to the existence of an I/O interruption for a guest in a wait state (the guest's PSW wait bit 14 is set on in the guest's state description, SD, indicating the guest wait state), or when a guest in not in a wait state but is not dispatched. The host may then put the guest in a runable (dispatchable) condition, by setting off the wait state bit 14 in its PSW, or dispatch the guest.

Priority Selection Process In Each Recognition Means

In FIG. 3, the host ICR 44 receives only the current zone 0 highest-priority mask-on host ISC. The alerting ICR 40 receives only the highest-priority enabled and set zone.ISC currently in any guest zone 1-N in the recognition means. The guest pass-through ICR contains the highest-priority enabled and set zone.ISC for the currently dispatched guest.

Only the alerting ICR has a clear (C) field. The C field gives the host the option of clearing the pending I/O interruption condition (removing the corresponding subchannel from the I/O interruption queue) or not. A 1 setting of the C field indicates the host is to clear the interruption. A C=0 setting indicates the interruption is not to be cleared; the subchannel is left on the I/O interruption queue, and the host merely is alerted to the existence of the pending guest I/O interruption. Normally, if C=0, the host will redispatch the guest and the I/O interruption will be passed-through to the guest. This is the preferred process for handling a guest's zone-.ISC interruption, since less system overhead is used than having the host simulate an interruption for a guest. However, guest pass-through is not feasible for all guest situations.

Other Potential Embodiments

Another embodiment of I/O interruption recognition means may use a single I/O code register which receives the highest-priority enabled zone.ISC value available in a CPU's I/O interruption recognition means.

Such ICR has four fields: H/A/G, ZONE, ISC and C. A two bit code can indicate whether the H/A/G field indicates the contained zone.ISC is for H (host), A (alert), G (pass-through guest), or invalid.

Another embodiment of I/O interruption recognition means may use a storage array in which respective rows contain the content for the respective zones found in the register pairs shown in FIG. 3. The array is coupled to circuit logic for performing the functions described for FIG. 3.

Selected Output for the I/O Interruption Recognition Means

Figure 4:
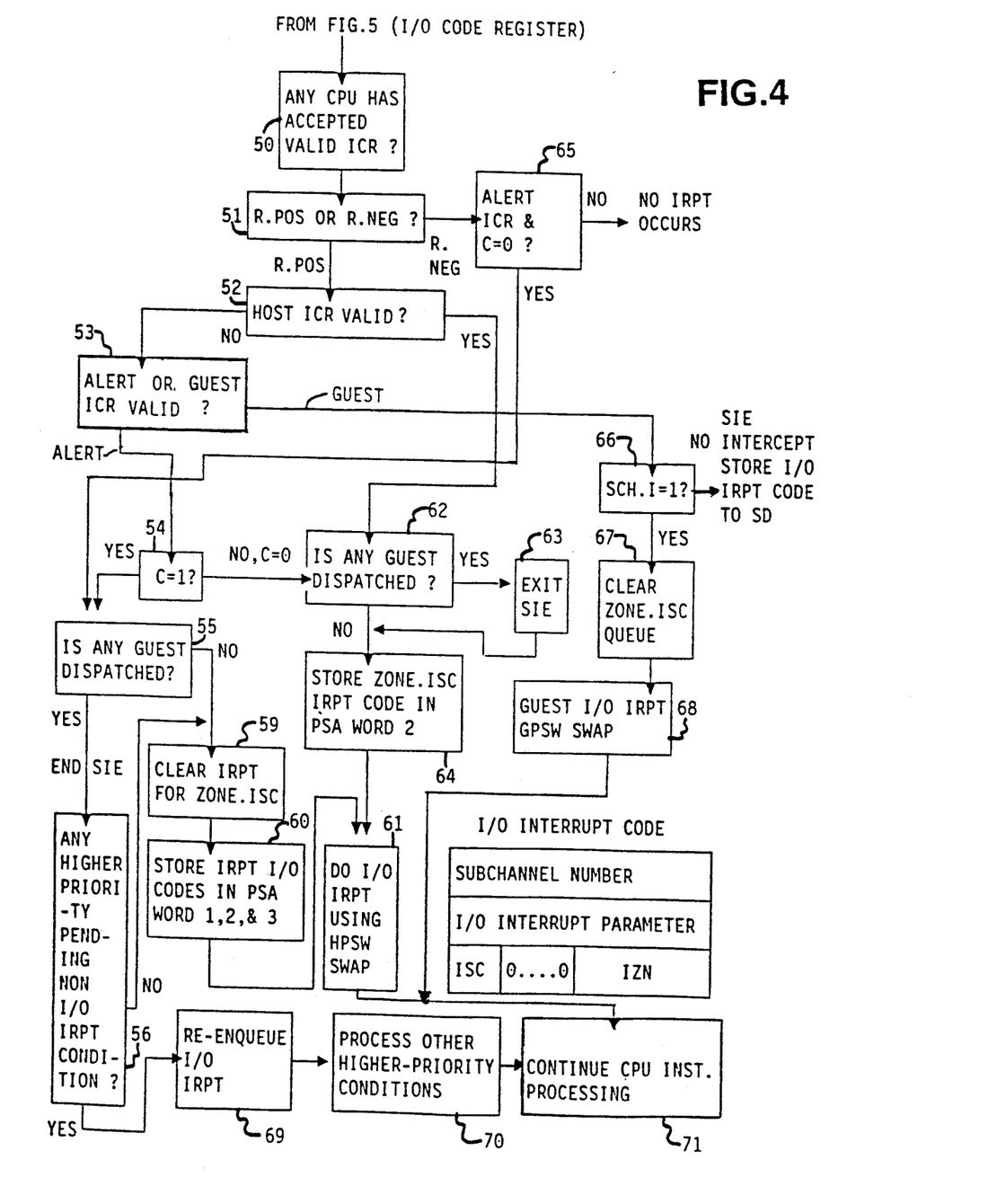
FIG. 4 represents a flow diagram of the microcode processing in each CPU of the priority zone.ISC provided from the I/O interruption recognition means in the same CPU.

FIG. 4 determines the selection of the highest-priority enabled and set zone.ISC in the I/O interruption recognition means of each CPU. The selected zone.ISC is from the highest-priority valid ICR of the three different ICRs 44, 40 or 20. They have the following priorities (1 being the highest and 3 being the lowest):

1. host I/O interruption in ICR 44,
2. alerting I/O interruption in ICR 40, and
3. guest pass-through I/O interruption in ICR 20.

CPU Processing of ICR Contents

Figure 5:
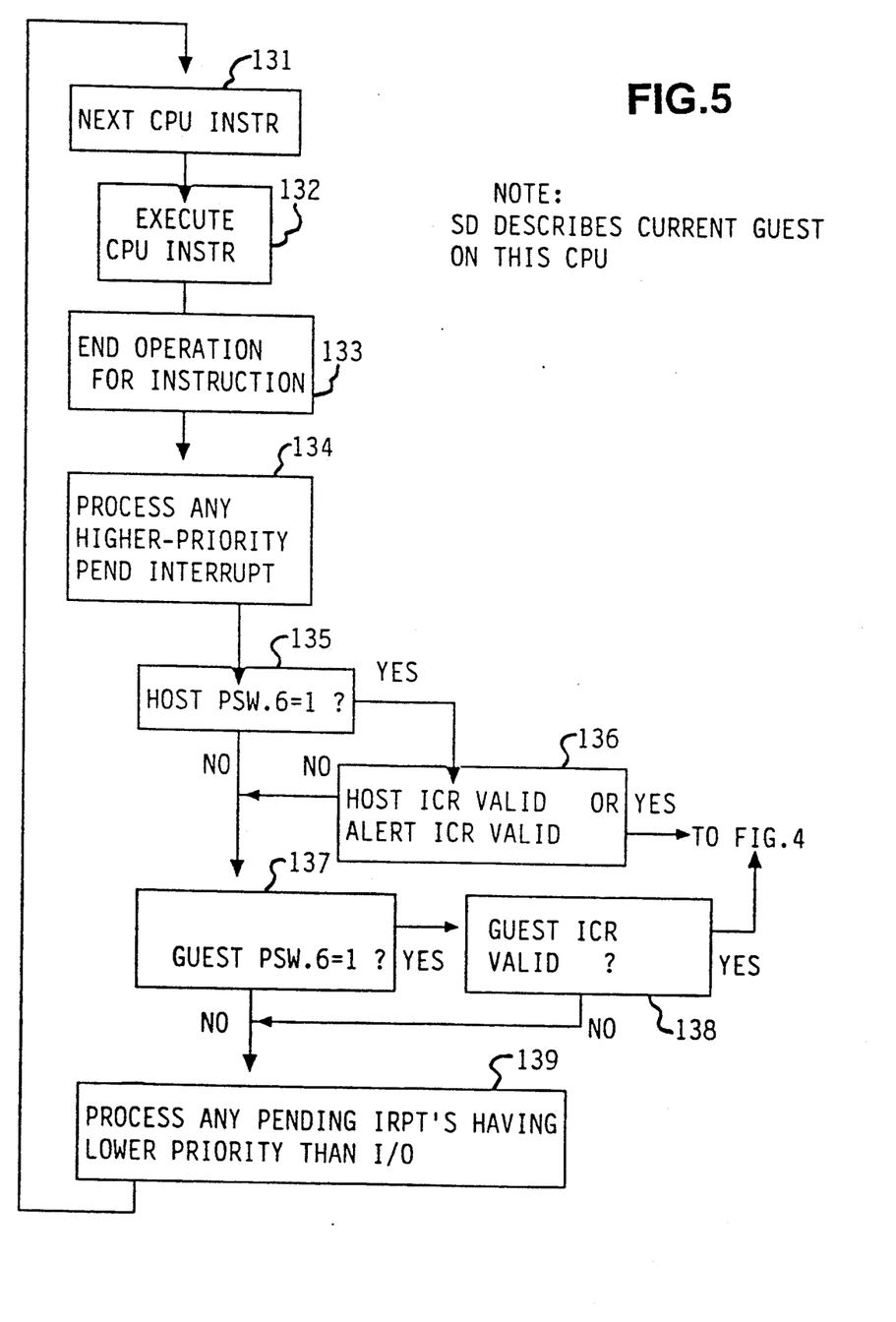
FIG. 5 represents CPU instruction processing by any CPU including in guest mode under the SIE (start instruction emulation) state.

FIG. 5 represents instruction execution by a guest dispatched on any CPU. Box 131 represents fetching the next instruction for the currently executing program. Box 132 represents CPU execution of that instruction, and box 133 represents the successful completion of its execution. At box 134, the currently-executing program has reached a point in its instruction processing that allows it to process a pending interruption, which at box 134 begin with its processing of its highest-priority enabled interruption, i.e. having a higher-priority than I/O interruptions. When the box 134 processing is completed, the processing of any pending enabled I/O interruptions can begin by entering box 135 to test whether the host is enabled by testing the state of bit 6 in the host PSW.

If the host PSW bit 6 indicates enablement in box 136, the yes exit to box 136 is entered, which checks the validity state (in FIG. 3) of the host ICR 44 and of the alert ICR 40. If either ICR 44 or 40 contains a valid content, the yes exit is taken from box 136 to entry point A of FIG. 4 to process an I/O interruption on the associated zone.ISC hardware queue represented in that ICR.

Box 137 is entered if box 135 finds the host PSW does not enable the CPU for host I/O interruptions, or if box 136 finds both ICRs 44 and 40 contain invalid contents. Box 137 tests whether the guest is enabled for the I/O interruption (by testing the setting of bit 6 in the guest PSW in the guest's SD).

If the guest's PSW bit 6 indicates enablement in box 137, the process takes the yes exit to box 138 to test if guest ICR 20 has its valid bit set-on. If the ICR 20 content is valid, box 138 takes its yes exit to the entry of FIG. 4 which processes the zone.ISC I/O interruption in the guest's ICR 20.

But if box 137 finds the guest is not enabled for I/O interruptions (i.e. PSW bit 6 is off), or if box 138 finds the guest ICR content is not valid, the no exit is taken from either box 137 or 138 to box 139 to process any other pending interruptions (non-I/O) having lower priority than I/O interruptions. Thereafter, CPU processing continues executing its instruction stream by reentering box 131.

Figure 2:
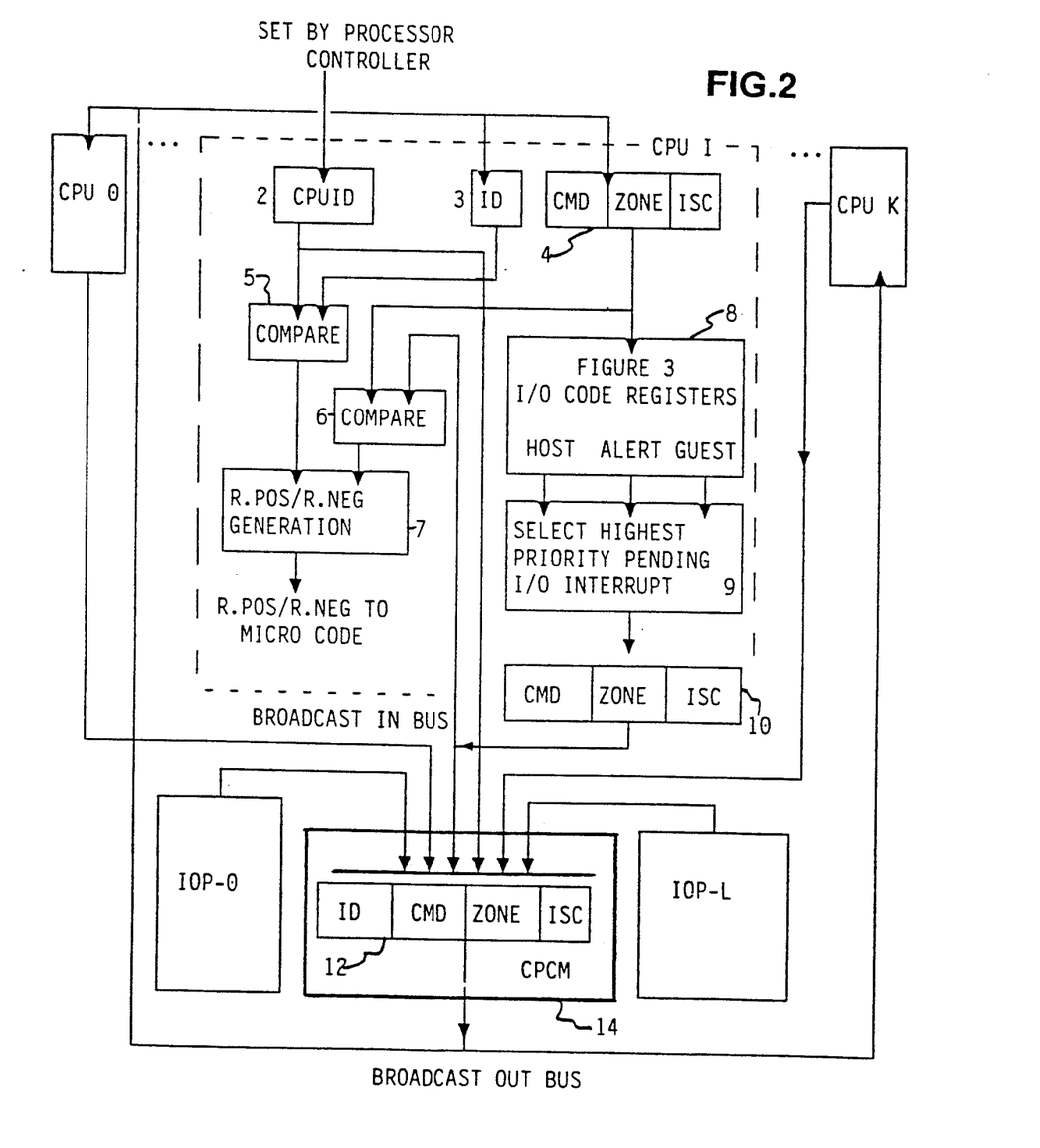
FIG. 2 represents hardware in a CPU acceptance process used among multiple CPUs connected by broadcast bussing to a CPU coordination means in a preferred embodiment.

Coordinated Processing of Valid ICRs of All CPUs (FIG. 2)

Priority controls in each CPU operating among ICRs 44, 40 and 20 select which of the three ICRs having valid contents has the highest-priority using the method described in FIG. 5. Any ICR not having a valid content is ignored in the prioritization determination.

When the highest-priority ICR is selected by its CPU for controlling I/O interruption processing, the CPU broadcasts a request command on a broadcast outbus 16 that connects to a CPU coordination means (CPCM) 14, which may be located in the system memory controller of the computer system. A DEQ command code is used.

The outbus 16 connects the selected one of ICRs 44, 40 and 20 from all CPUs in the system (CPU 0 through CPU K) to the CPCM 14. The CPCM 14 contains a register 12. Register 12 registers and accepts the first zone.ISC received during a cycle of operation. Any other CPU sending a zone.ISC during the cycle is rejected (not registered). Each CPU sending a zone.ISC also sends its CPUID which is put into an ID field in register 12 when the CPU's zone.ISC is registered.

As soon as a DEQ command is registered in CPCM 14 it transmits the command components (ID, CMD operation code, and a zone.ISC) on an outbus 17 to all CPUs in the system. Each CPU receives the transmitted ID in register 3 and the remainder of the command in register 4. Then, the CPU compares in comparator 5 the received ID with its own CPUID stored in register 2, and in comparator 6 the received zone.ISC with its transmitted zone.ISC. The first DEQ request received by this CPU which matches the transmitted zone.ISC sets either the R.POS or R>NEG signal. If both comparators 5 and 6 compare-equal, box 7 generates an R.POS signal which indicates to the microcode of this CPU that its selected ICR has been accepted by the CPCM, so that this CPU can then process (dequeue) an I/O interruption from the I/O queue represented by the current zone.ISC in the accepted ICR.

If either comparator indicates an equal condition, but comparator 5 indicates an unequal condition, an R.NEG signal is generated by box 7 which indicates to the microcode of this CPU that its selected ICR has been not been accepted by the CPCM, so that this CPU will not then process an I/O interruption from the I/O queue represented by the current zone.ISC in the accepted ICR. (However, the CPU may nevertheless participate in a general alerting operation for a non-accepted but valid zone.ISC in ISC 40 to alert the host in the manner explained for box 65 in FIG. 4).

In the manner represented in FIG. 4, an I/O interruption is then cleared (dequeued) by the accepted CPU from the I/O interruption queue identified by the accepted zone.ISC. Then there is one less interruption on that queue, which may or may not then be an empty queue.

All CPUs receiving a DEQ command broadcast from the CPCM reset off that zone.ISC bit in the IPR in their I/O interruption recognition means upon acceptance on any CPU, and this IPR bit reset occurs regardless of whether an R.POS or R.NEG signal was generated. If the queue of this zone.ISC queue is not empty, this zone.ISC in each CPU is again set on in a next cycle in each CPU; this has the effect of causing a last selected zone.ISC for a non-empty queue to again become the highest-priority zone.ISC in the next cycle of operation for all CPU recognition means, unless a still higher-priority zone.ISC was set into the recognition means IPRs in the interim. This resetting and setting of the accepted zone.ISC bits in the IPRs synchronizes the valid zone-.ISC contents in the ICRs of all CPUs with the headers of all zone.ISC I/O interruption queues.

Processing a Selected I/O Code Register Entry (FIG. 4)

FIG. 4 is a flow diagram of the processing in any CPU of the content of an accepted I/O code register (ICR) 44, 40 or 20 from FIG. 3. Box 50 indicates that the respective CPU has currently determined that a broadcast-received ID and zone.ISC is an acceptance by the coordination means 14 in FIG. 2 of the CPU's broadcast-sent zone.ISC from one of the ICRs in the CPU.

Box 51 tests whether an R.POS (acceptance) or R.NEG (rejection) signal has been generated in the CPU. If an acceptance was obtained, box 52 tests if the zone is 0, indicating a host I/O interruption is to be processed. Box 52 tests if the accepted zone.ISC is for an host ICR or not. If not, box 53 is entered to test if the accepted zone.ISC is for an alert ICR or not. If not, the accepted zone.ISC is for a guest ICR, and box 66 is entered. Box 66 tests if an SCH.I field is set off to allow the yes exit to be taken to box 67 to continue the guest processing of the pass-through I/O interruption. If the SCH.I field is on, the no exit is taken and the guest processing is ended. Thus, the SCH.I field gives the host control over whether pass-through processing is enabled for the guest.

Box 67 has the pass-through guest process the I/O interruption by clearing it from the zone.ISC hardware queue. Then box 68 has the guest take the interruption, which involves swapping the I/O PSWs in the guest's SD, i.e. GPSWs. The pass-through interrupt processing in now complete, and the CPU continues processing other CPU instructions in box 71.

However, if box 53 finds the alert ICR was the source of the accepted zone.ISC, box 54 is entered to test the C bit state from the alert ICR. The C bit allows this invention to have either the host or the guest clear (remove and process) a guest interruption from its zone.ISC interruption queue, or the guest to clear the interruption after the host has been alerted to awake a wait state guest or immediately dispatch an undispatched guest, or let the guest wait until it is dispatched according to its regular dispatching schedule.

Box 54 tests the state of the clear (C) bit to determine if the host is to clear (remove) the interruption from its queue. The C=1 state indicates the host is to clear the interruption from its hardware-controlled queue. The C=0 state indicates the I/O interruption is left on its hardware-controlled queue.

If box 54 finds the C=1 state, box 55 then tests if any guest is currently dispatched. If yes, its dispatch is ended by ending its SIE state (intercepting SIE). The next box 56 tests for any higher-priority interruptions (other than I/O). If yes, the current I/O interruption cannot be processed and it is re-enqueued by box 69 to eliminate the possibility that the I/O interruption may be lost before the CPU can come back to it. Then, box 70 processes the other higher-priority conditions.

But if box 55 finds no guest is dispatched, box 59 is entered to clear the interruption from the current zone.ISC queue. Then, box 60 stores the interruption codes for the zone.ISC interruption into the I/O interruption area reserved in the CPU's PSA (program save area).

Box 61 then has the host take the I/O interruption by doing a swap of the host's I/O PSWs.

However, if box 54 finds C=0, box 62 is entered to test if any guest is currently dispatched. If yes, the guest's dispatch is ended by ending its SIE state (intercepting SIE), and box 64 is entered to store the interruption code for this zone.ISC I/O interruption into the area reserved in the CPU's PSA (program save area) for I/O interruption matters. The zone.ISC values in the ICR are stored in word 2 of the I/O interrupt code in the PSA (program save area) at real address location zero for that guest, to which the guest's offset is added to locate the guest's PSA in the CEC's main memory. And zeros are stored in words 0 and 1 of this I/O interrupt code in the PSA. Then, the I/O interruption is taken which involves swapping PSWs in the convention way for an ESA/390 system. Next, box 61 is entered and operates as previously explained for box 61.

Box 52 takes its yes exit if the host ICR was accepted, and then enters box 55. The paths through box 55 operate as previously described.

A special case occurs if box 51 finds an R.NEG signal and box 65 is entered and finds the alert ICR content is valid in its CPU. The R.NEG signal indicates the respective CPU has not been accepted; but in this case an alert I/O interruption is still taken on this CPU if C=0. The no exit is taken from box 65 when the alert ICR content is not valid or the interruption is to be cleared (C=1) by the selected CPU, and then no interruption occurs on this CPU. But if the alert ICR is valid and if C=0, the yes exit is taken from box 65 and box 62 is entered to alert the host. The paths through box 62 operate as previously described to cause the I/O interruption to occur. Since the alert I/O interruption does not clear the pending I/O interruption condition when C=0, other CPUs in the configuration which are also enabled for this zone.ISC and have C=0 in their ZMR for this zone, may also take an alert I/O interruption. Normally, however, the host only enables one CPU for alert I/O interruptions for a particular zone.ISC when C=0 is specified in the ZMR. The SIGP set ZMT facility allows the host to update the zone mask table in other CPUs if the host decides to change alerting enablement.

One CPU Setting Zone.ISC Mask in Other CPUs

The invention allows any CPU to send out a command to set a zone.ISC mask in all other CPUs or in a designated CPU.

This is done in FIG. 2 by a CPU issuing a command with a special command code for this function on its inbus 16 to the CPU coordination means 14. If the command is to be sent to only one other CPU, the command will have the ID of the target CPU. But if the command is to be sent to all other CPUs, the command will not have the ID of any CPU, and for example may use an predetermined CPUID code such as one higher than any CPUID in the system.

Then coordination means 14 sends the command on its broadcast outbus 17 to the other CPUs. All other CPUs receive the command, and interpret its command code and ID. If the special CPUID is detected, every CPU sets on or off (as indicated in the command) the designated zone.ISC position in the CPU's I/O interruption recognition means. If a CPU matches on its own CPUID, only that CPU sets on or off (as indicated in the command) the designated zone.ISC mask position in that CPU's I/O interruption recognition means.

Figure 6:
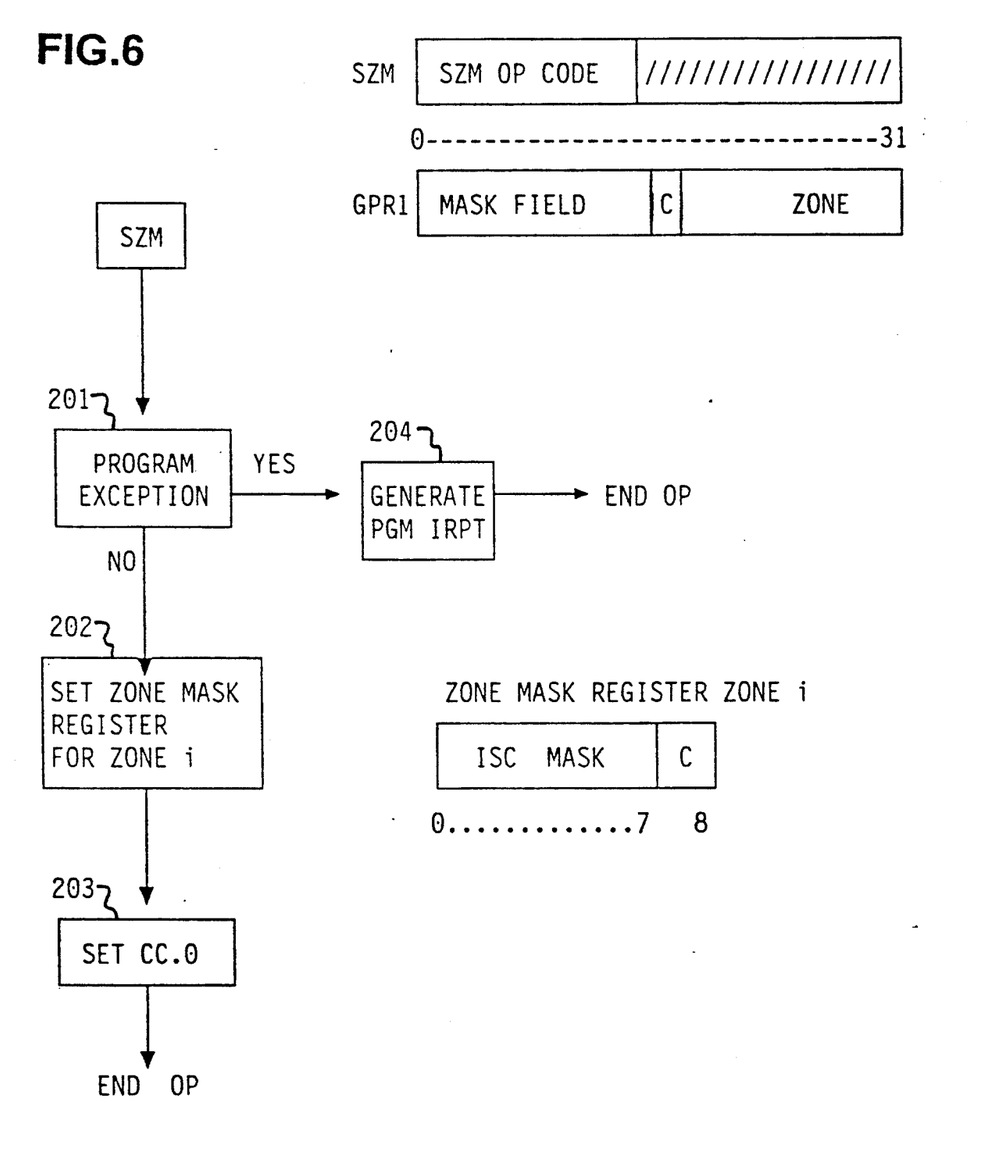
FIG. 6 represents a SZM (set zone mask) instruction, and its execution by the host to set a specified zone enablement mask register (from the content of a general register).

Set Zone Mask (SZM) Instruction (FIG. 6)

The SZM instruction allows the mask bits for all ISCs in zones 1-N to be set on or off according to bit states provided in a mask field in a general purpose register (GPR1). The fields in GPR1 are divided into a mask field, a clear bit (C) field and a zone identification. These fields are set before the SZM instruction is used to establish settings required for an eight-bit mask and C bit, and the identified zone.

FIG. 6 shows the hardware/microcode processing of the instruction. First box 201 takes its yes exit to cause a program interruption to whatever program is executing this instruction if an exception condition is detected by the microcode or hardware executing this instruction. For example, a test is made on the zone value in the GPR1 against the zones provided in the system configuration, and an exception is generated if the zone is not provided, or if the zone value in GPR1 is zero.

If no exception condition is detected, the no exit is taken to box 202, which stores the mask and C bit from GPR1 into the zone mask register and C bit in the zone designated in GPR1.

Then box 203 sets the condition code (CC) for the instruction to represent its completion conditions. A zero CC indicates a successful completion of the SZM instruction execution.

Store Zone Mask Table (STZMT) Instruction (FIG. 7)

The STZMT instruction (shown in FIG. 7) operates differently from the set zone mask instruction shown in FIG. 6. The STZMT instruction stores into system memory the entire mask and C bits contained in the I/O instruction recognition means of the CPU issuing the STZMT instruction. The location in system memory for storing this mask is given in a B2,D2 operand in the instruction.

FIG. 7 shows the hardware/microcode processing of the instruction. First box 211 takes its yes exit to box 214 which generates a program interruption to whatever program is executing this instruction if an exception condition is detected by the microcode or hardware executing this instruction.

If no exception condition is detected, the no exit is taken to box 212, which stores the mask and C bit from all necessary zone mask registers of the issuing CPU in the designated B2, D2 memory location. The stored mask includes the zone number with the stored content of each zone mask register. However, this instruction may perform compression by only storing the masks for zones having at least one bit set to an enabling state; then non-stored zones are presumed to contain only disabling bits. (A subsequently used SZM instruction can test a stored zone number before fetching and using a particular zone's mask state.)

Then box 213 sets a condition code (CC) for the instruction to represent its completion condition. A zero CC indicates a successful completion of the SZM instruction execution. A non-zero CC indicates an unsuccessful completion.

While the invention has been described with reference to the preferred embodiments thereof, various modifications and changes will become apparent to those skilled in the art which may be made therein without departing from the true spirit and scope of the invention as defined by the appended claims.

Having thus described our invention, what we claim as new and desire to secure by Letters Patent is:

1. A method in a computer system having a plurality of logical partitions for supporting communication of host and guest I/O interruptions from I/O controls to an operating system controlling the computer system, each partition assigned a subset of the memory and I/O resources in the system, comprising the steps of:
   providing in each CPU in the system an I/O interruption recognition means comprising a plurality of interruption subclass (ISC) positions and a corresponding plurality of masking positions, a plurality of zones respectively comprised of subsets of the ISCs and mask positions, the zones respectively associated with a host hypervisor (host) and guest operating systems (guests) assigned to a plurality of partitions in the computer system;
   setting any ISC position to indicate if an I/O interruption currently exists in a corresponding I/O interruption queue provided in the computer system;
   setting each of the mask positions to a respective enablement or disablement state for controlling the ability of the CPU to recognize the setting of an ISC position in a respective zone; and
   selecting an ISC enabled by its corresponding mask position being set to a mask-on state.

2. A method of enabling CPU recognition of I/O interruptions in a computer system as defined in claim 1, further comprising the steps of:
   setting a clear position to either a clear or not-clear state for each guest zone, the clear state indicating the host is to clear the I/O interruption from any I/O interruption queue associated with the zone of the respective guest, and the not-clear state indicating the host is not to clear the I/O interruption from the queue, but instead the guest is to clear the I/O interruption from the queue.

3. A method of enabling CPU recognition of I/O interruptions in a computer system as defined in claim 1, further comprising the steps of:
   prioritizing the zones according to a predetermined sequence in each CPU, and prioritizing the ISCs within each zone according to a predetermined sequence; and
   presenting an I/O interruption for the highest-priority zone.ISC to this CPU.

4. A method of enabling CPU recognition of I/O interruptions in a computer system as defined in claim 3, the processing step further comprising:
   dispatching the guest assigned to the zone of the selected I/O interruption to handle the selected I/O interruption when the guest is not currently dispatched and is in a predefined category.

5. A method of enabling CPU recognition of I/O interruptions in a computer system as defined in claim 3, further comprising the steps of:
   having a guest on any available CPU in the system process a selected I/O interruption having a zone and ISC assigned to the guest when the guest is dispatched on the CPU.

6. A method of enabling CPU recognition of I/O interruptions in a computer system as defined in claim 3, the detecting step further comprising the steps of:
   indicating if the zone of the detected ISC is assigned to the host; and
   causing the host to take the I/O interruption.

7. A method of enabling CPU recognition of I/O interruptions in a computer system as defined in claim 3, further comprising the steps of:
   indicating if the zone of the detected ISC is assigned to a guest;
   causing the guest to take the I/O interruption if the guest is dispatched on the CPU.

8. A method of enabling CPU recognition of I/O interruptions in a computer system as defined in claim 3, further comprising the steps of:
   indicating if the zone of the detected ISC is assigned to a guest;
   alerting the host to a selected I/O interruption for a guest not dispatched on the CPU; and
   dispatching the guest to handle the I/O interruption when the guest is a type able to process the I/O interruption.

9. A method of enabling CPU recognition of I/O interruptions in a computer system as defined in claim 3, further comprising the steps of:
   indicating if the zone of the detected ISC is assigned to a guest;
   alerting the host to a selected I/O interruption of a type of the guest is not able to process; and
   handling the I/O interruption by the host.

10. A method of enabling CPU recognition of I/O interruptions in a computer system as defined in claim 3, further comprising the steps of:
    signalling to a multiple CPU coordination means in the system when each CPU reaches an interruption processing state, the signalling providing a zone and ISC identification for a currently selected ISC; and
    broadcasting by the coordination means to all CPUs in the system of each received zone and ISC identification with a CPU identification in order to allow only the identified CPU to handle an I/O interruption represented by the received zone.ISC.

11. A method of enabling CPU recognition of I/O interruptions in a computer system as defined in claim 1, further comprising the steps of:
    arranging the IPRs and mask registers in a semiconductor bit array, and providing circuit logic and/or microcode for controlling the defined steps.

12. A method of enabling CPU recognition of I/O interruptions in a computer system as defined in claim 1, further comprising:

selecting the highest-priority guest ISC indicating a pending I/O interruption for a guest not currently dispatched on a CPU, the guest ISC being enabled by a mask-on setting in a corresponding position in the guest's mask register; and alerting the host in any CPU in the system of the existence.

13. A method of enabling CPU recognition of I/O interruptions in a computer system as defined in claim 12, further comprising:

providing a code register to receive the current highest priority enabled zone and ISC value existing in the I/O interruption recognition means of the CPU.

14. A method of enabling CPU recognition of I/O interruptions in a computer system as defined in claim 13, further comprising:

providing a host code register to receive the current highest priority enabled zone and ISC value existing in the I/O interruption recognition means of the CPU only when the zone indicates the received value is for the host.

15. A method of enabling CPU recognition of I/O interruptions in a computer system as defined in claim 13, further comprising:

providing a guest code register to receive the current highest priority enabled zone and ISC value existing in the I/O interruption recognition means of the CPU only when the zone indicates the received value is for a guest.

16. A method of enabling CPU recognition of I/O interruptions in a computer system as defined in claim 13, further comprising:

providing an alerting code register to receive the current highest priority enabled zone and ISC value existing in the I/O interruption recognition means of the CPU only when the zone indicates the received value is for a guest not dispatched on the CPU.

17. A method of enabling CPU recognition of I/O interruptions in a computer system as defined in claim 16, further comprising:

providing a clear indication for each guest zone represented in the I/O interruption recognition means to indicate whether the host or guest is to clear an I/O interruption from a queue associated with the respective zone; and signalling a not-clear indication for a currently selected ISC in the alerting code register for a guest not currently dispatched on the CPU to enable the host to dispatch the guest without clearing the alerted I/O interruption for passing-through the I/O interruption to the guest to clear the interruption.

18. A method of enabling CPU recognition of I/O interruptions in a computer system as defined in claim 17, further comprising:

dispatching of the guest on the CPU by the host when the currently alerted I/O interruption has the clear state indicated for the zone of the guest.

19. A method of enabling CPU recognition of I/O interruptions in a computer system as defined in claim 17, further comprising:

signalling from the alerting code register a clear indication for a currently selected ISC for a guest not currently dispatched on the CPU to indicate that the host is to handle the I/O interruption.

20. A method of enabling CPU recognition of I/O interruptions in a computer system as defined in claim 13, further comprising:

storing a plurality of separate masks in memory;

overlaying the mask positions in the I/O interruption recognition means with any stored mask independently of enablements and disablements of the ISCs.

21. A method of enabling CPU recognition of I/O interruptions in a computer system as defined in claim 18, further comprising:

performing by the host program of the I/O interruption currently indicated for the zone and ISC value in the code register of the CPU when the clear state is indicated for a guest, and passing the results of the I/O interruption by the host program to a memory location in a partition of the guest for use by the guest when next dispatched on the CPU during scheduled dispatching of the guest.

22. A method of enabling CPU recognition of I/O interruptions in a computer system as defined in claim 12, further comprising:

performing by the host in any CPU in the system an I/O interruption of the host program before the CPU performs any guest I/O interruptions.

23. A method of enabling CPU recognition of I/O interruptions in a computer system as defined in claim 5, further comprising:

atomically discontinuing the emulation of a guest on a CPU having an I/O interruption indicated in the code register by requiring the host to clear the associated I/O interruption and store I/O interruption parameters in a guest partition area reserved for the CPU and have the host take the I/O interruption for the guest.

24. A method of enabling CPU recognition of I/O interruptions in a computer system as defined in claim 1, further comprising:

storing at any time during CPU operation a set of mask bits in the mask positions of the I/O interruption recognition means of a CPU for indicating a current enablement or disablement state for the ISC positions.

25. A method of enabling CPU recognition of I/O interruptions in a computer system as defined in claim 1, further comprising:

providing a number of partitioned guests which exceeds the maximum number of ISCs available in any zone to any guest, in which the number of partitioned guests is independent of the maximum number of ISCs available to any guest.

26. A method of enabling CPU recognition of I/O interruptions in a computer system as defined in claim 1, further comprising:

overlaying an I/O interruption control mask in the I/O interruption recognition means for controlling alerting of the host by masking-on the masking positions having a higher priority than the zone and ISC last received in the I/O code register.

27. A method of enabling CPU recognition of I/O interruptions in a computer system as defined in claim 1, further comprising:

providing a relocation partition identifier (RZN) and an I/O interruption partition identifier (IZN) in a subchannel control block of an I/O program;

associating the RZN with an address offset in system memory for one partition containing the I/O program to enable addressing of the I/O program; and associating the IZN with an address offset in system memory for addressing a CPU program of a guest in a different partition to receive the I/O interruptions of the I/O program, to enable the guest to be in different partition from the partition containing the I/O program.

28. A method of enabling CPU recognition of I/O interruptions in a computer system as defined in claim 27, further comprising the steps of:

changing the IZN in the subchannel control block to change the partition receiving the I/O interruptions of the I/O program to a partition of a different guest.

29. A method of enabling CPU recognition of I/O interruptions in a computer system as defined in claim 2, further comprising the steps of:

providing a clear field with each zone associated with a respective guest;

setting the clear field to indicate to the host (when alerted by an I/O interruption for the respective guest) if the interruption is to be removed (cleared) or not from an I/O interruption queue by the host; and allowing the guest to remove the I/O interruption from the associated queue if the clear field indicates the interruption is not to be cleared by the host.

30. A method of enabling CPU recognition of I/O interruptions in a computer system as defined in claim 1, further comprising the steps of:

enabling the host to optionally avoid simulating software I/O interruption queues by enabling the guests to have direct control of taking I/O interruptions from hardware managed I/O interruption queues.

31. A method of enabling CPU recognition of I/O interruptions in a computer system as defined in claim 30, further comprising the steps of:

enabling a guest to take I/O interruptions from hardware managed I/O interruption queues; and indicating to the host to take an I/O interruption of the guest.

32. A method of enabling CPU recognition of I/O interruptions in a computer system as defined in claim 1, further comprising the steps of:

changing the content of the mask positions in a CPU at the time of dispatching a guest on the CPU.

33. A method of enabling CPU recognition of guest I/O interruptions in a computer system as defined in claim 12, further comprising the steps of:

masking-on the ISCs having higher priority than a guest being dispatched in a CPU, and masking-off the ISCs in the CPU having a priority lower than the guest being dispatched.

34. A method of enabling CPU recognition of I/O interruptions in a computer system as defined in claim 2, further comprising the steps of:

providing a system with a microcode-managed I/O interruption queue for each ISC in each IPR for each partition, and allowing a software operating system to access these queues without requiring any corresponding set of I/O interruption queues to be managed by the software operating system; and signalling to all CPUs when an I/O interruption has been enqueued by indicating the zone and ISC identifying the I/O interruption queue to the CPU.

35. A method of enabling CPU recognition of I/O interruptions in a computer system as defined in claim 34, further comprising the steps of:

setting on a corresponding ISC field of all CPUs receiving the signalled zone and ISC indication; and alerting the host to an I/O interruption indicated in a particular ISC when the the interruption is given highest priority for alerting the host.

36. Means for enabling CPU communication of I/O interruptions in a computer system having a plurality of logical partitions, each partition containing a subset of the memory and I/O resources in the system, comprising the steps of:

providing in each CPU an I/O interruption recognition means comprising a plurality of interrupt pending registers (IPRs) with corresponding mask registers, an IPR being provided for the host and for each guest partition available in the system, and each IPR having a plurality of positions representing respective I/O interruption subclasses (ISCs);

setting the mask registers to represent a respective enablement/disablement state for the respective ISC positions in the IPRs for controlling the ability of the CPU to recognize I/O interruptions communicated to all IPRs; and dispatching a host hypervisor program (host) or a guest operating system (guest) on each of a plurality of CPUs in the system for accessing the resources assigned to the partition of a guest.

37. A method of enabling CPU recognition of I/O interruptions in a computer system as defined in claim 1, further comprising the steps of:

masking-on the ISCs for zones having a guest in wait state, for enabling the host to alert a waiting guest which is not in a condition to handle an I/O interruption;

masking-off the ISCs for zones having a guest not in wait state which are in a condition to handle an I/O interruption; and having higher priority than a guest being dispatched in a CPU, and masking-off the ISCs in the CPU having a priority lower than the guest being dispatched.

38. A method of enabling CPU recognition of I/O interruptions in a computer system as defined in claim 3, further comprising the steps of:

sending to all CPU I/O interruption recognition means in the system the zone and ISC identifier of each queue receiving a pending I/O interruption; and setting in each CPU's recognition means the zone and ISC position corresponding to each zone and ISC identifier sent by the sending step to allow the recognition means in each CPU to recognize each pending I/O interruption with its assigned zone.

39. A method of enabling CPU recognition of I/O interruptions in a computer system as defined in claim 38, further comprising the steps of:

reaching an interruptible point in the processing by any CPU in the system;

request signalling a detected ISC position to a coordination control means by the CPU reaching an interruptible point;

accept signalling by the coordination control means to the CPU doing the request signalling to allow the CPU to take the interruption; and again setting the detected ISC position if the CPU cannot take the I/O interruption or if the I/O interruption queue represented by the detected ISC position has at least one other pending I/O interruption.

40. A method of enabling CPU recognition of I/O interruptions in a computer system as defined in claim 1, further comprising the step of:

enqueuing by the CPU of an I/O interruption without involving any I/O device.

41. A method of enabling CPU recognition of I/O interruptions in a computer system as defined in claim 1, further comprising the step of:

generating by any CPU of status information for an I/O device; and placing the status information into a control block associated with an I/O device.

42. A method of enabling CPU recognition of I/O interruptions in a computer system as defined in claim 3, further comprising the step of:

performing by the host of an I/O interruption in response to an enabled guest ISC indicating the existence of the I/O interruption without the guest performing the I/O interruption.

43. A method of enabling CPU recognition of I/O interruptions in a computer system as defined in claim 1, further comprising the step of:

enabling and/or disabling by one CPU of one or more zone.ISC positions in another CPU.

44. A computer system having a plurality of logical partitions for supporting communication of host and guest I/O interruptions from I/O controls to host and guest operating systems controlling the computer system, each partition having an assigned subset of the memory and I/O resources of the system, comprising:

I/O interruption recognition means in each CPU in the system having for each zone a plurality of interruption subclass (ISC) positions and a corresponding plurality of masking positions, different zones associated with a host hypervisor (host) and guest operating systems (guests), each zone including a part of system memory assigned to a respective partition of a guest and having an address offset and address limit;

each ISC position being set to indicate if an I/O interruption currently exists in a corresponding hardware-controlled I/O interruption queue provided in the computer system;

each mask positions being set to a respective enablement or disablement state for controlling the ability of the CPU to recognize the setting of an ISC position in a respective zone;

means for prioritizing the zones according to a predetermined sequence in each CPU, and means for prioritizing the ISCs within each zone according to a predetermined sequence; and means for outputting an I/O interruption for the highest-priority zone.ISC enabled and set in any CPU.

45. CPU recognition means for I/O interruptions in a computer system as defined in claim 44, further comprising:

means for setting a clear position associated with each zone mask to either a clear or not-clear state for each guest zone, the clear state indicating the host is to clear the I/O interruption from any I/O interruption queue associated with the zone of the respective guest, and the not-clear state indicating the host is not to clear the I/O interruption from the queue, but instead the guest is to clear the I/O interruption from the queue.

* * * * *